(12) United States Patent
Wang et al.

(10) Patent No.: US 6,877,660 B2
(45) Date of Patent: Apr. 12, 2005

(54) POSITIONING STRUCTURE FOR A SCANNING ARTICLE

(75) Inventors: Chi Nan Wang, Taipei (TW); Jung Kai Cheng, Taipei (TW)

(73) Assignee: Lite-On Technology Corporation

( * ) Notice: Subject to any disclaimer, the term of this patent is extended or adjusted under 35 U.S.C. 154(b) by 0 days.

(21) Appl. No.: 10/687,873

(22) Filed: Oct. 20, 2003

(65) Prior Publication Data

US 2005/0006474 A1 Jan. 13, 2005

(30) Foreign Application Priority Data

Jul. 8, 2003 (TW) ........................ 92212512 U

(51) Int. Cl.⁷ .............................................. G06K 7/00
(52) U.S. Cl. .................... 235/454; 235/479; 235/486; 358/497; 358/474
(58) Field of Search ................... 358/475, 474, 358/497, 483, 487, 482, 505, 509, 512–14, 506, 498, 492, 494, 471, 486; 235/454, 475, 479, 486; 399/265, 380, 370, 371, 375, 376

(56) References Cited

U.S. PATENT DOCUMENTS

| | | | | |
|---|---|---|---|---|
| 5,239,759 A | * | 8/1993 | Dudek | 33/42 |
| 5,574,542 A | * | 11/1996 | Brook, III | 399/380 |
| 5,710,967 A | * | 1/1998 | Motoyama | 399/377 |
| 5,907,413 A | * | 5/1999 | Han | 358/497 |
| 6,157,440 A | * | 12/2000 | Ikeda | 355/75 |
| 6,534,761 B2 | * | 3/2003 | Fukatsu et al. | 250/222.1 |
| 6,608,989 B2 | * | 8/2003 | Anderson et al. | 399/377 |
| 6,637,897 B2 | * | 10/2003 | Tsai et al. | 353/120 |
| 6,678,075 B1 | * | 1/2004 | Tsai et al. | 358/487 |
| 2002/0039205 A1 | * | 4/2002 | Chang | 358/487 |

* cited by examiner

Primary Examiner—Karl D. Frech
Assistant Examiner—Daniel Walsh
(74) Attorney, Agent, or Firm—Slater & Matsil, L.L.P.

(57) ABSTRACT

A positioning structure for a scanning article, applied in a scanning apparatus. The positioning structure has a hollow shell, at least one flexible and a positioning module. The hollow shell is disposed on a scanning platform and has at least one opening and projected portion formed thereon. The flexible element is used to prevent foreign objects or light from falling into the hollow shell. The positioning module is assembled with the hollow shell. Users can put the scanning article into the hollow shell through the opening, and then the scanning article is accurately positioned in a predetermined position for scanning by the positioning module.

20 Claims, 9 Drawing Sheets

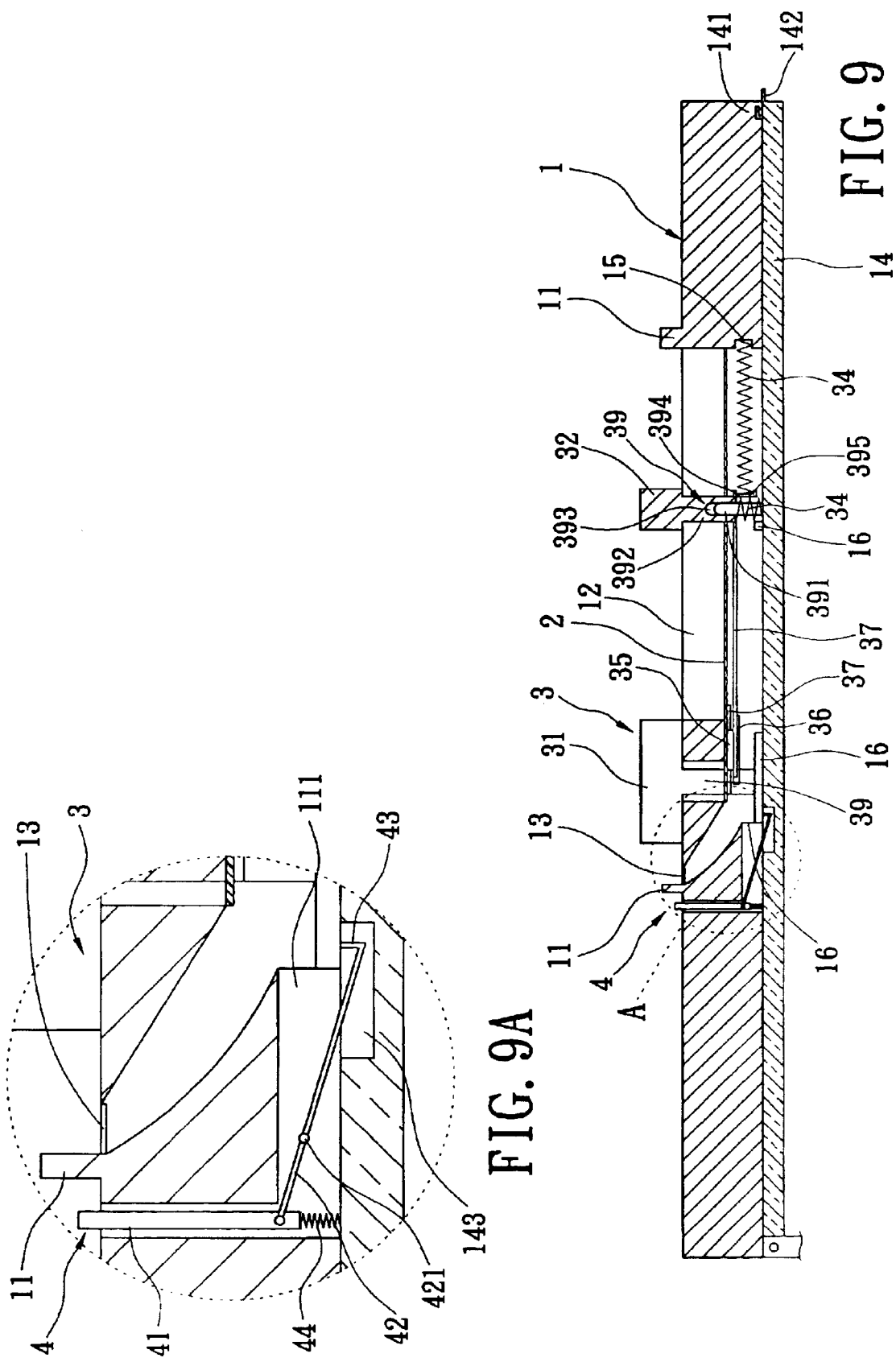

POSITIONING STRUCTURE FOR A SCANNING ARTICLE

This nonprovisional application claims priority under 35 U.S.C. § 119(a) on Patent Application No(s). 92212512 filed in Taiwan on Jul. 8, 2003, which is herein incorporated by reference.

BACKGROUND OF THE INVENTION (1) Field of the Invention

The present invention relates to a positioning structure for a scanning article, applied in a scanning apparatus, and more particularly to a positioning structure that positions the scanning article in a predetermined position with an elastic element or an assembly element with a gear and a rack for scanning he scanning article accurately.

(2) Description of the Related Art

Referring to FIG. 1 and 2, the prior art provides a positioning structure for a scanning article, applied in a scanning apparatus. The positioning structure includes a clipped plate 1a, a transparent bottom plate 4a formed under the clipped plate 1a and a transparent protected layer 3a pivoted over the clipped plate 1a. The clipped plate 1a has four positioning grooves 2a and three testing points 5a formed thereon. The clipped plate 1a has a width equal to that of A4 paper. Each of the four positioning grooves 2a has a size equal to that of a calling card and a transparent stop plate for positioning the calling card received therein. The three testing points are arranged in an isosceles triangle for auto-adjusting the plate 1a in an accurate position to position the calling card.

However, it is difficult to set the scanning article (such as the calling card) in the same position every time. The positioning grooves 2a limit the size of the scanning article when using the scanning apparatus.

SUMMARY OF THE INVENTION

The primary object of the present invention is to provide a positioning structure for a scanning article, applied in a scanning apparatus, in which the positioning structure includes a hollow shell and an opening formed in the hollow shell through which users place the scanning article. Accordingly, the positioning structure does not limit the size of the scanning article when using the scanning apparatus.

Another object of the present invention is to provide a positioning structure for a scanning article, applied in a scanning apparatus, in which the positioning structure includes an elastic element or a gear and a rack to make the positioning structure position the scanning article accurately. This tends to be a micro-module.

In accordance with one aspect of the present invention, which is to provide a positioning structure for a scanning article, applied in the scanning apparatus having a scanning platform, a scanning light source is received in the scanning platform and an image acquisition system is arranged in a light path of the scanning light source for slidably contacting with the scanning platform. The positioning structure comprises a hollow shell, a stop portion, at least one flexible element and a positioning module. The hollow shell is disposed on the scanning platform and has at least one opening and projected portion formed thereon. The stop portion is formed between the projected portion and the scanning article. The flexible element is fixed in the hollow shell opposite the scanning platform. The positioning module is assembled to the hollow shell. Users place the scanning article in the hollow shell through the opening, and the scanning article is positioned in a predetermined scan position by the positioning module.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

Other objects, features and advantages of the present invention will be more apparent from the following detailed description when read in conjunction with the accompanying drawings in which:

FIG. 9 is a top view of the positioning structure for a scanning article according to a fourth embodiment of the present invention;

FIG. 9A is a partial view of FIG. 9;

DETAILED DESCRIPTION OF THE PREFERRED EMBODIMENT

A description will now be given of the preferred embodiments of the present invention with reference to the accompanying drawings.

The present invention adapts to all scanning apparatuses including multi-function products, scanners, printers, faxes, portable multi-function products and auto-scanners.

Figure 1:
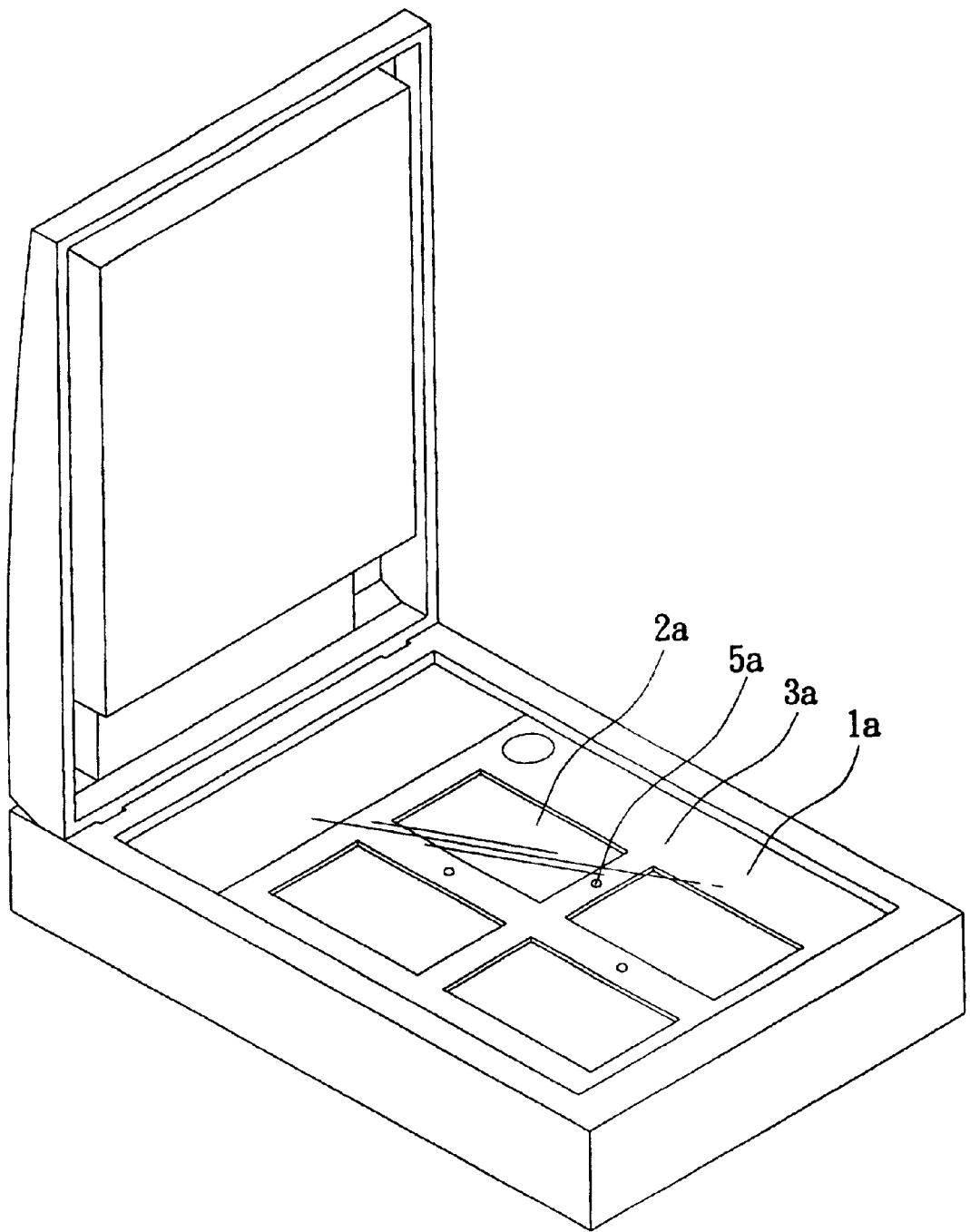
FIG. 1 is a perspective view of the positioning structure for a scanning article according to the prior art.
Figure 2:
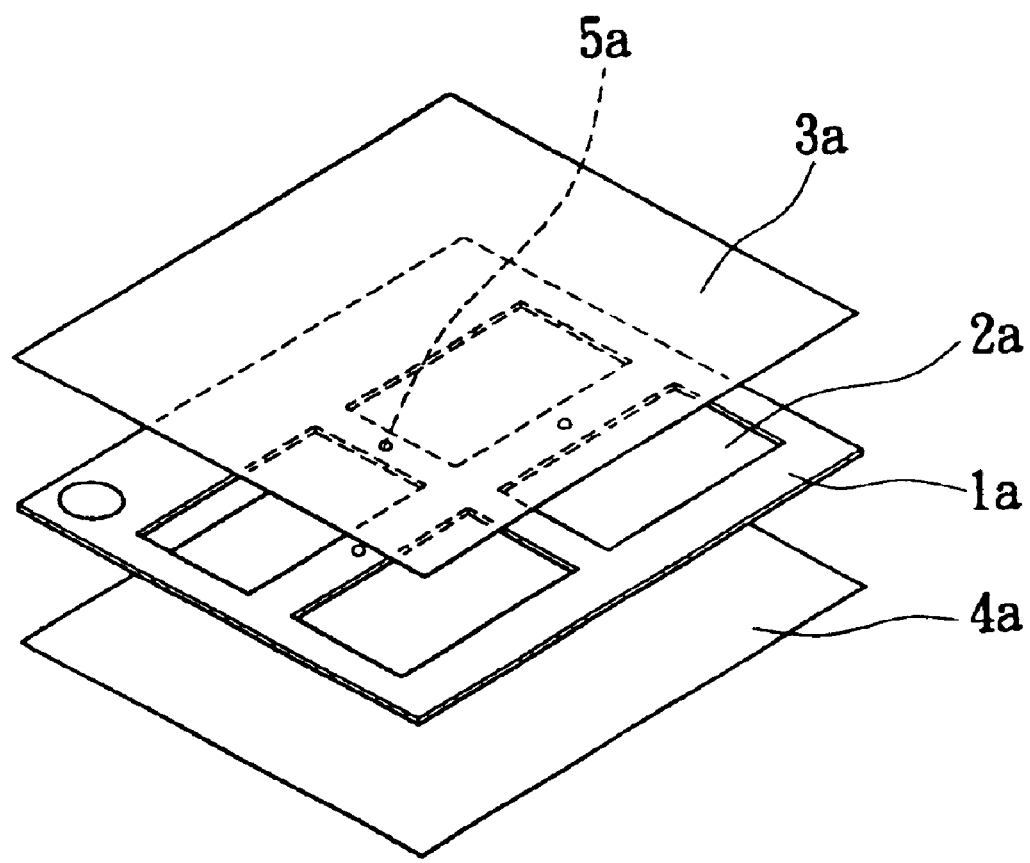
FIG. 2 is an exploded view of FIG. 1.
Figure 3:
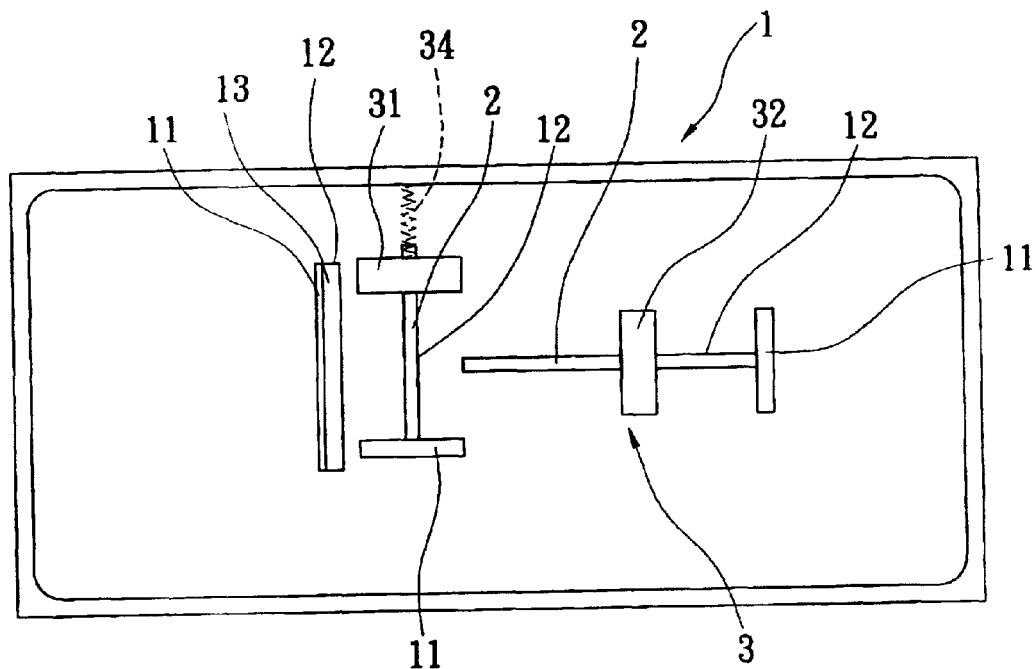
FIG. 3 is a top view of the positioning structure for a scanning article according to a first embodiment of the present invention.
Figure 4:
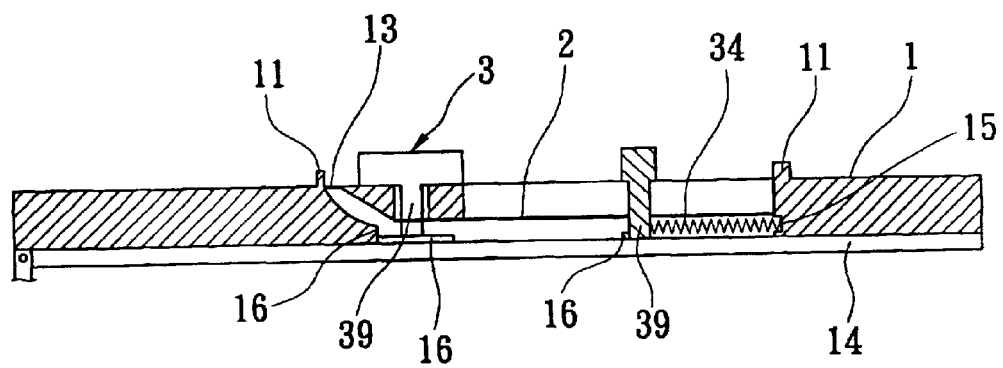
FIG. 4 is a front cross-sectional view of FIG. 3.

Referring to FIGS. 3 to 4, according to a first embodiment of the present invention, a positioning structure for a scanning article, applied in a scanning apparatus is provided. The scanning apparatus includes a scanning platform, a scanning light source received in the scanning platform and an image acquisition apparatus arranged in a light path of the scanning light source for slidably contacting the scanning platform The positioning structure includes an upper cover 1, a flexible element 2 and a positioning module 3. The upper cover 1 is disposed on the scanning platform, has at least one opening 12 and projected portion 11 formed thereon and a transparent plate 14 formed between the upper cover 1. A user places a scanning article onto the transparent plate 14 of the upper cover 1 through the opening 12. The opening 12 has a cover plate 13 disposed thereon The upper cover 1 has a guiding groove formed from the opening 12 to pass through the upper cover 1 for guiding the scanning article. The flexible element 2 is disposed in the upper shell 1 to shelter the opening 12 or a gap of the opening 12 from light or dust. The positioning module 3 includes a width positioning sliding block 31 and a length positioning sliding block 32. The length positioning sliding block 32 has a projected portion 39 received in the hollow shell 1 through the opening 12 and the flexible element 2, and a transparent stop portion 16 formed on the projected portion 39. A user may move the positioning sliding blocks 31 and 32 along the opening 12 to control movement of the transparent stop portion 16 on the transparent plate for adjusting the scanning article in a predetermined position for scanning. The positioning module 3 further includes an elastic element 34 received in the hollow shell 1. One side of the elastic element 34 contacts a concave portion 15 of the hollow shell 1, and another side of the elastic element 34 contacts the projected portion 39 to provide elasticity to make the transparent stop portion 16 to closely contact a side of the scanning article and position the scanning article in a predetermined position for scanning. The scanning apparatus is coordinated with an image acquisition apparatus and software to enhance the accuracy and the scanning quality of the scanning apparatus.

The transparent stop portion 16 is extended from the projected portion 11 to the transparent plate 14 to provide a predetermined boundary origin set at an edge thereof. A user can move the positioning sliding block 31 and 32 along the opening 12 to control movement of the transparent stop portion 16 on the transparent plate for adjusting scanning articles of different sizes in a predetermined position for scanning.

Figure 5:
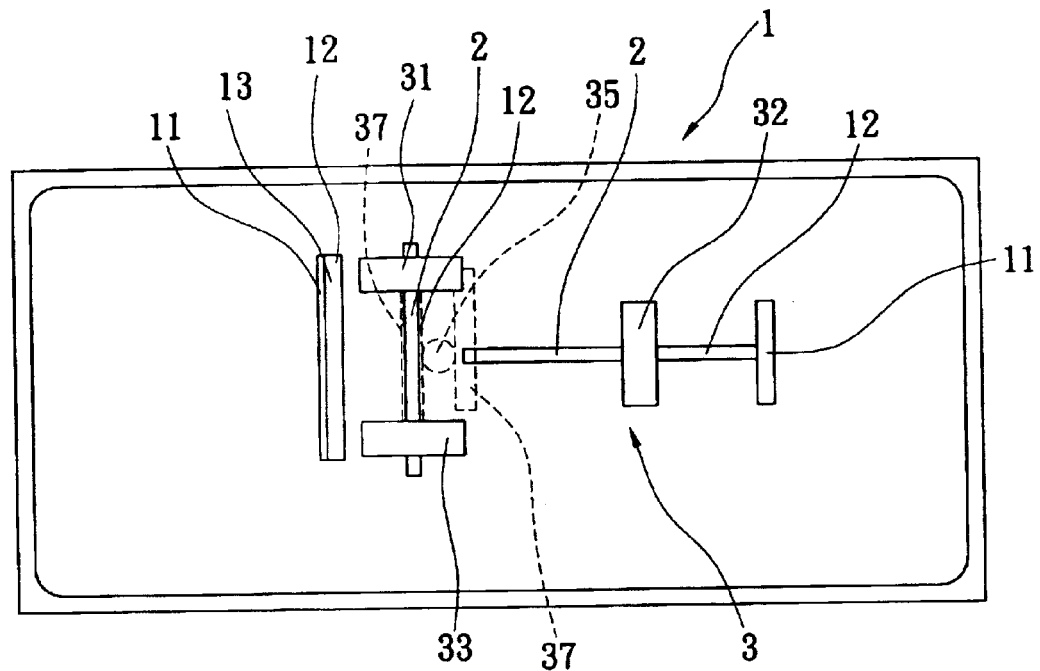
FIG. 5 is a top view of the positioning structure for a scanning article according to a second embodiment of the present invention.
Figure 6:
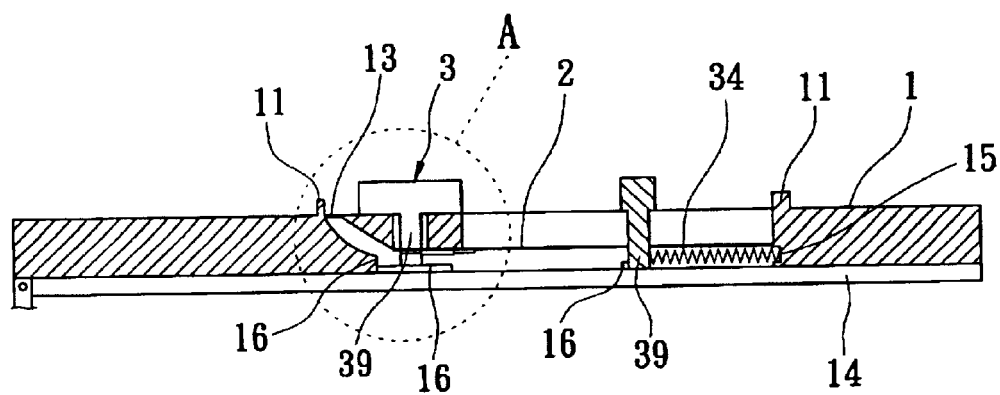
FIG. 6 is a front cross-sectional view of FIG. 5.
Figure 6A:
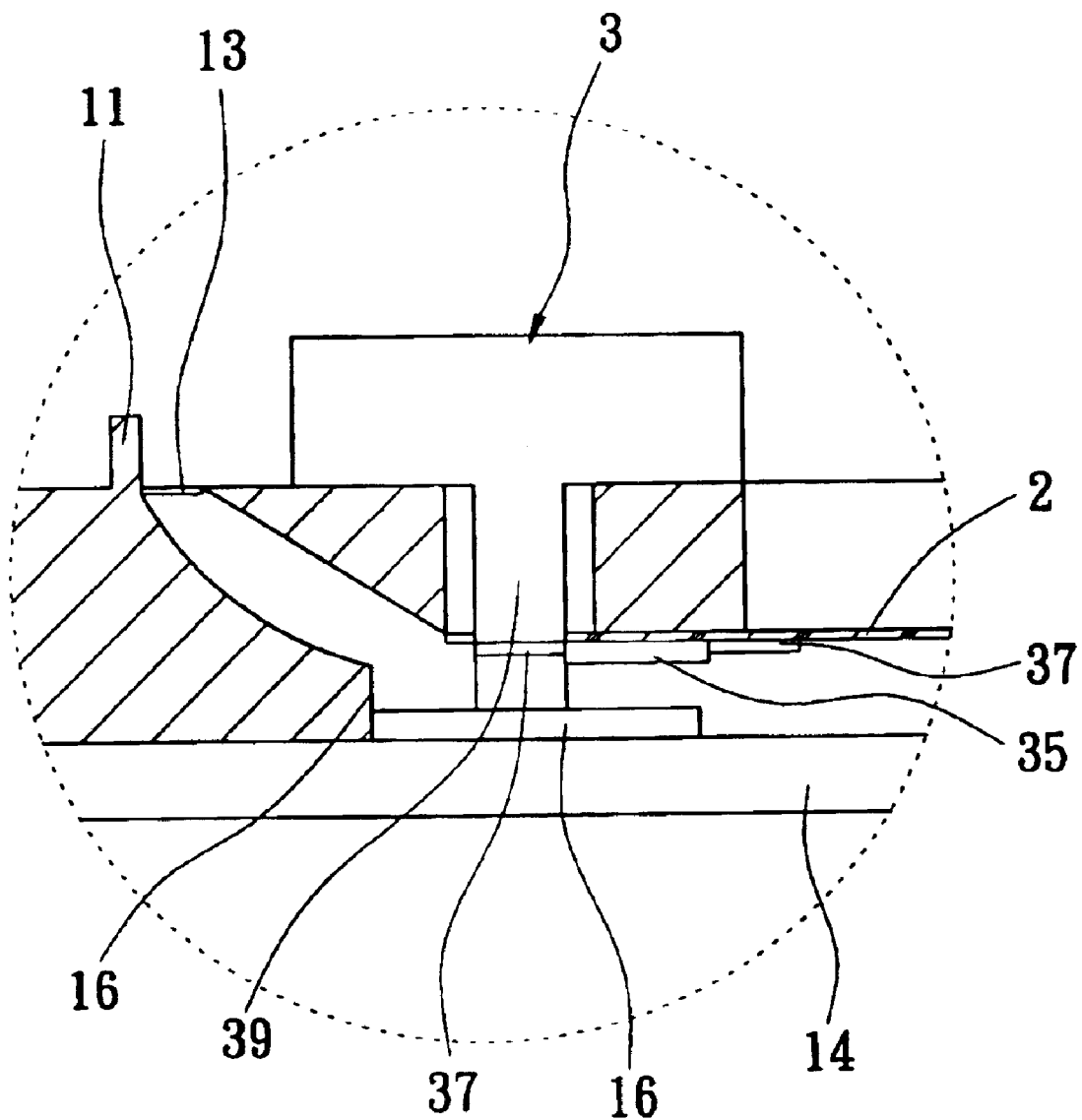
FIG. 6A is a partial view of FIG. 6.

Referring to FIG. 5 to FIG. 6A, according to a second embodiment of the present invention, a positioning structure for a scanning article is provided, including a hollow shell 1, flexible element 2 and a positioning module 3. The hollow shell 1 is disposed on a scanning platform, has at least one opening 12 and projection portion 11 formed thereon and a transparent plate 14 formed between the hollow shell 1 and the scanning platform A user places a scanning article onto the transparent plate 14 of the hollow shell 1 through the opening 12. The opening 12 has a cover plate 13 disposed thereon. The hollow shell 1 has a guiding groove formed from the opening 12 to pass through the hollow shell 1 for guiding the scanning article. The flexible element 2 is disposed in the hollow shell 1 to shelter the opening 12 or a gap of the opening 12 from the light or dust into the opening 12. The positioning module 3 includes a right-width positioning sliding block 31 and a left-width positioning sliding block 33 horizontally disposed at a left side of the right-width positioning sliding block 31 and a length positioning sliding block 32 vertically disposed at a side of the right-width positioning sliding block 31 and the left-width positioning sliding block 33. Each of the positioning sliding blocks 31, 32 and 33 has at least one projected portion 39 received in the hollow shell 1 through the opening 12 and the flexible element 2. The projected portion 39 has two gear portions 37 and a transparent stop portion 16 formed thereon The positioning module 3 further includes two gears 35 received in the hollow shell 1 for mating with the two gear portions 37 and an elastic element 34 received in the hollow shell 1. One side of the elastic element 34 contacts a concave portion 15 of the A hollow shell 1, and another side of the elastic element 34 contacts the projected portion 39 for providing elasticity to make the transparent stop portion 16 closely contact a side of the scanning article and position the scanning article in a predetermined position for scanning. The scanning apparatus is coordinated with an image acquisition apparatus and software to enhance the accuracy and the scanning quality of the scanning apparatus.

The two gear contacts 37 respectively horizontally contact two sides of the two gears 35 for mating with the two gears 35. The projected portion 37 of the second positioning sliding block 32 further includes a non-gear contact in contact with the elastic element 34. The user can adjust the positioning sliding blocks 31, 32 and 33 to position the scanning article on the same axial line. The transparent stop portion 16 is extended from the projected portion 11 to the transparent plate 14 to provide a predetermined boundary origin set at an edge thereof. A user can move the positioning sliding blocks 31, 32 and 33 along the opening 12 to control the gear to drive the transparent stop portion 16 horizontally on the transparent plate 14 for adjusting scanning articles with different sizes in a predetermined position for scanning.

Figure 7:
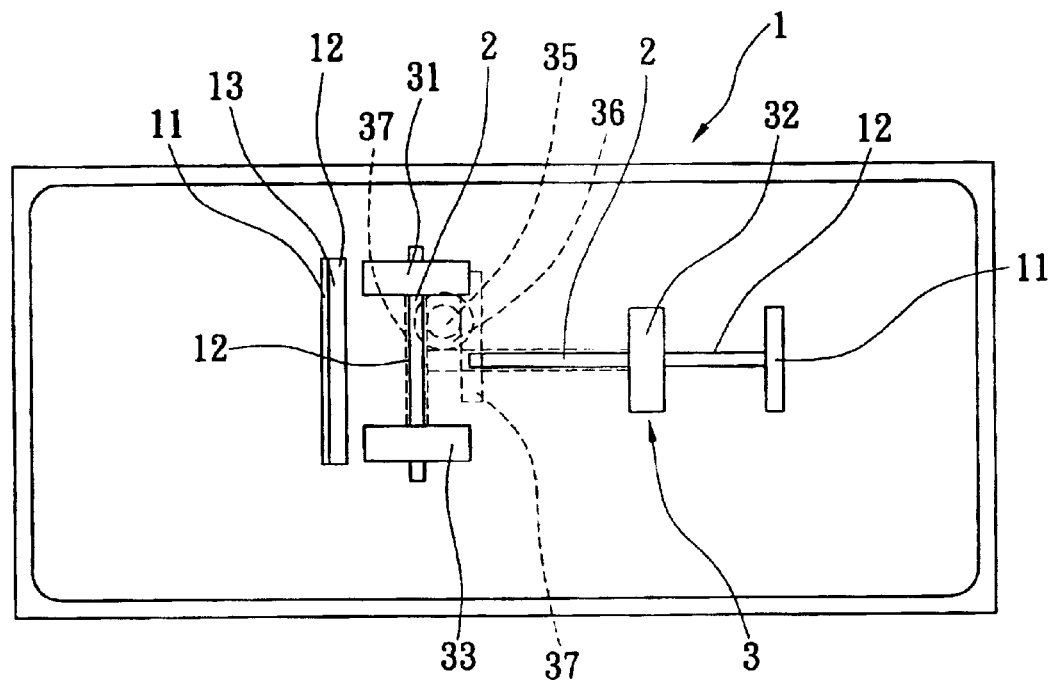
FIG. 7 is a top view of the positioning structure for a scanning article according to a third embodiment of the present invention.
Figure 8:
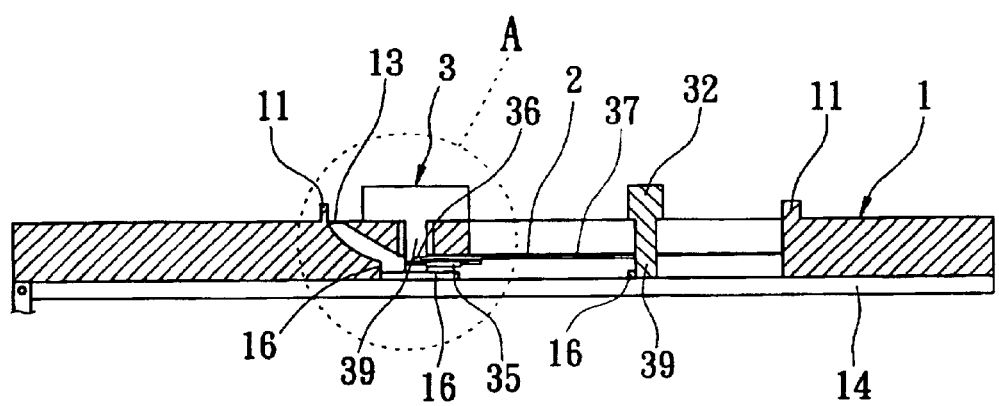
FIG. 8 is a front cross-sectional view of FIG. 7.
Figure 8A:
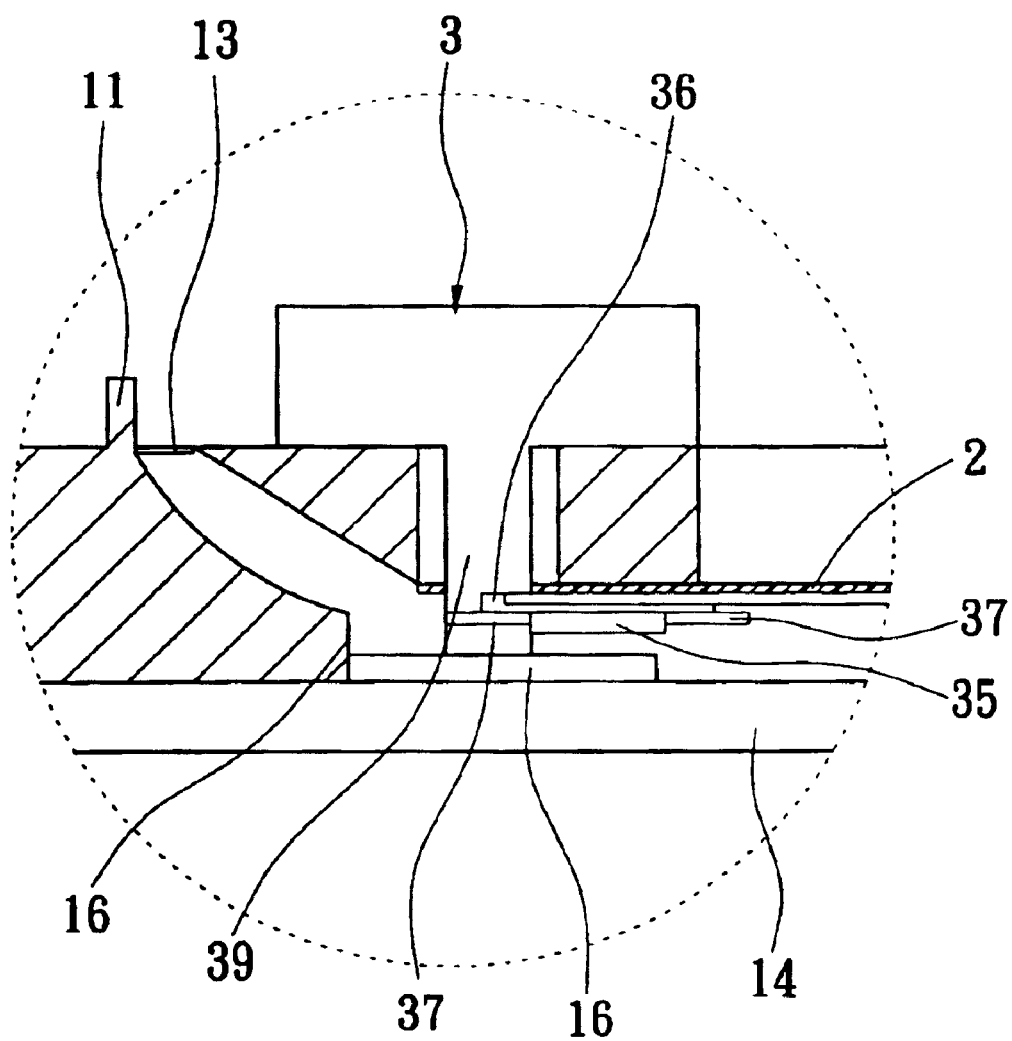
FIG. 8A is a partial view of FIG. 8.

Referring to FIG. 7 to FIG. 8A, according to a third embodiment of the present invention, a positioning structure for the scanning article is provided, including an upper cover 1, flexible element 2 and a positioning module 3. The upper cover 1 is disposed on a scanning platform, and has at least one opening 12 and projected portion 11 formed thereon and a transparent plate 14 formed between the upper cover 1 and the scanning platform A user may place a scanning article onto the transparent plate 14 of the upper cover 1 through the opening 12. The opening 12 has a cover plate 13 disposed thereon. The upper cover 1 has a guiding groove formed from the opening 12 to pass through the upper cover 1 for guiding the scanning article. The flexible element 2 is disposed in the upper cover 1 to shelter the opening 12 or a gap of the opening 12 from light or dust. The positioning module 3 includes a first positioning sliding block 31 and a third positioning sliding block 33 horizontally disposed at a left side of the first positioning sliding block 31 and a second positioning sliding block 32 vertically disposed at a side of the first positioning sliding block right-width positioning sliding block 31 and the left-width positioning sliding block 33. Each of the positioning sliding blocks 31, 32 and 33 has at least one projected portion 39 received in the hollow shell 1 through the opening 12 and the flexible element 2. The projected portion 39 has two gear portions 37 and a transparent stop portion 16 formed thereon The positioning module 3 further includes at least one gear received in the hollow shell 1 for mating with the two gear portions 37. The gear has a first gear 35 and a second gear 36 stacked with the first gear 35 on the same axle center. An embedded element (as a tenon or a pin) is fixed between the two gears 35 and 36 for preventing the displacement between two gears 35 and 36. The first gear 35 has a C-shaped retaining ring disposed at an end thereof for fixing the gears 35 and 36 on the projected portion 11. The first gear 25 is ½times a pitch diameter of the second gear 36 for positioning a particular scanning article with a size of, for example, 3×5 or 4×6. The transparent stop portion 16 closely contacts a side of the scanning article and positions the scanning article in a predetermined position for scanning The scanning apparatus is coordinated with an image acquisition apparatus and software to enhance the accuracy and the scanning quality of the scanning apparatus.

The two gear portions 37 are respectively horizontally disposed at two sides of the gears 35, 36 for mating with the gears 35, 36. The projected portion 37 of the length positioning sliding block 32 mates with the second gear 36. The user can adjust the positioning sliding blocks 31 or 33, and at the same time drive the length positioning sliding block 32 to position the scanning article. In other words, the positioning sliding blocks 31 or 33 are moved one unit, and the length positioning sliding block 32 is moved two units with respect to the positioning sliding blocks 31 or 33 at the same time for positioning the particular scanning article.

Referring to FIG. 7 to FIG. 8A, according to a third embodiment of the present invention, a positioning structure for the scanning article is provided, including a hollow shell 1, flexible element 2 and a positioning module 3. The hollow shell 1 is disposed on a scanning platform, and has at least one opening 12 and projected portion 11 formed thereon and a transparent plate 14 formed between the hollow shell 1 and the scanning platform. A user may place the scanning article onto the transparent plate 14 of the hollow shell 1 through the opening 12. The opening 12 has a cover plate 13 disposed then The hollow shell 1 has a guiding groove formed from the opening 12 to pass through the hollow shell 1 for guiding the scanning article. The flexible element 2 is disposed in the hollow shell 1 to shelter the opening 12 or a gap of the opening 12 from the light or dust. The positioning module 3 includes a right-width positioning sliding block 31 and a left-width positioning sliding block 33 horizontally disposed at a left side of the right-width positioning sliding block 31 and a length positioning sliding block 32 vertically disposed at a side of the right-width positioning sliding block 31 and the left-width positioning sliding block 33. Each of the positioning sliding blocks 31, 32 and 33 has at least one projected portion 39 received in the hollow shell 1 through the opening 12 and the flexible element 2. The projected portion 39 has two gear portions 37 and a transparent stop portion 16 formed thereon. The positioning module 3 further includes at least one gear received in the hollow shell 1 for mating with the two gear portions 37. The gear has a first gear 35 and a second gear 36 stacked with the first gear 35 on the same axle center, and an embedded element (such as a tenon or a pin) fixed between the two gears 35 and 36 for preventing displacement between two gears 35 and 36. The first gear 35 has a C-shaped retaining ring disposed at an end thereof for fixing the gears 35 and 36 on the projected portion 11. The first gear 25 is ½ times a pitch diameter of the second gear 36 for positioning a particular scanning article with a size of, for example, 3×5 or 4×6. The transparent stop portion 16 closely contacts a side of the scanning article and positions the scanning article in a predetermined position for scanning. The scanning apparatus is coordinated with an image acquisition apparatus and software to enhance the accuracy and the scanning quality of the scanning apparatus.

The two gear portions 37 are respectively horizontally disposed at two sides of the gears 35, 36 for mating with the gears 35, 36. The projected portion 37 of the length positioning sliding block 32 mates with the second gear 36. The user can adjust the positioning sliding blocks 31 or 33, and at the same time to drive the length positioning sliding block 32 to position the scanning article. In other words, the positioning sliding blocks 31 or 33 are moved one unit, and the length positioning sliding block 32 is moved two units with respect to the positioning sliding blocks 31 or 33 at the same time for positioning the particular scanning article.

Referring to FIG. 9 to FIG. 9A, according to a fourth embodiment of the present invention, a positioning structure for the scanning article is provided, including a hollow shell 1, flexible element 2 and a positioning module 3. The hollow shell 1 is disposed on a scanning platform, and has at least one opening 12 and projected portion 11 formed thereon and a transparent plate 14 formed between the hollow shell 1 and the scanning platform. A user places a scanning article onto the transparent plate 14 through the opening 12. The transparent plate 14 has at least one embedded portion 141 embedded on the hollow, shell 1 and a projected edge 142 disposed near the embedded portion 141 for separating from the hollow shell 1 or combining with the hollow shell 1. The scanning article is placed onto the transparent plate 14 through the opening 12. The opening 12 has a cover plate 13 disposed thereon. The hollow shell 1 has a guiding groove formed from the opening 12 to pass through the hollow shell 1 for guiding the scanning article. The positioning module 3 includes a right-width positioning sliding block 31 and a left-width positioning sliding block 33 horizontally disposed at a left side of the right-width positioning sliding block 31 and a length positioning sliding block 32 vertically disposed at a side of the right-width positioning sliding block 31 and the left-width positioning sliding block 33. Each of the positioning sliding blocks 31, 32 and 33 has at least one projected portion 39 received in the hollow shell 1 through the opening 12. The projected portion 39 has two gear portions 37 and a transparent stop portion 16 formed thereon. The length positioning sliding block 32 has a first projected portion 392 and a second projected portion 391. The first projected portion 392 has a hollow concave portion 393 with an annular section at an end thereof. One end of the second projected portion 391 has a transparent stop portion 16 in contact with the transparent plate 14, and another end of the second projected portion 391 received in the hollow concave portion 393. The positioning module 3 has an elastic element 34 disposed at an axle center of the first projected portion 392 and the second projected portion 391. The hollow concave portion 393 has an annular stop plate 394 in contact with the elastic element 34. The stop plate 394 defines an extended portion 395 extended therefrom to contact another elastic element 34. The positioning module 3 further includes at least one gear received in the hollow shell 1 for mating with the two gear portions 37. The gear has a first gear 35 and a second gear 36 stacked with the first gear 35 on the same axle center, and an embedded element fixed between the two gears 35 and 36 for preventing displacement between two gears 35 and 36. The first gear 35 has a C-shaped retaining ring disposed at an end thereof for fixing the gears 35 and 36 on the projected portion 11. The first gear 35 is ½ times a pitch diameter of the second gear 36 for positioning a particular scanning article with a size of, for example. 3×5 or 4×6. The transparent stop portion 16 closely contacts a side of the scanning article and positions the scanning article in a predetermined position for scanning. The scanning apparatus is coordinated with an image acquisition apparatus and software to enhance the accuracy and the scanning quality of the scanning apparatus.

Moreover, the backward module 4 has a first link 41 received in the concave groove 111 through the hollow shell 1, a second link 42 pivoted on a pivot portion 421 of an inside wall of the concave groove 111 and an elastic element 44. One end of the second link 42 contacts one end of the fast link 41, and another end of the second link 42 has a projected support 43 received in the concave hole 143 of the transparent plate 14. One end of the elastic element 44 is connected to the transparent plate 14, and another end of the elastic element 44 is connected to the first link 41, so as to press a part of the fast link 41 projected above the hollow shell 1 for backing the scanning article from the transparent plate 14.

The protrusion 39 results in an elastic placement between the first projected portion 392 and the second projected portion 391, so that the user can press the length positioning sliding block 37 to separate the gear portion 37 and the second gear 36, and then adjust a scanning article not of a 3×5 or 4×6 size into a predetermined position. In other words, the positioning structure is used to position any size of scanning article, and the backward module 4 can protect the scanning article from deformation or damage by the positioning structure.

Figure 10:
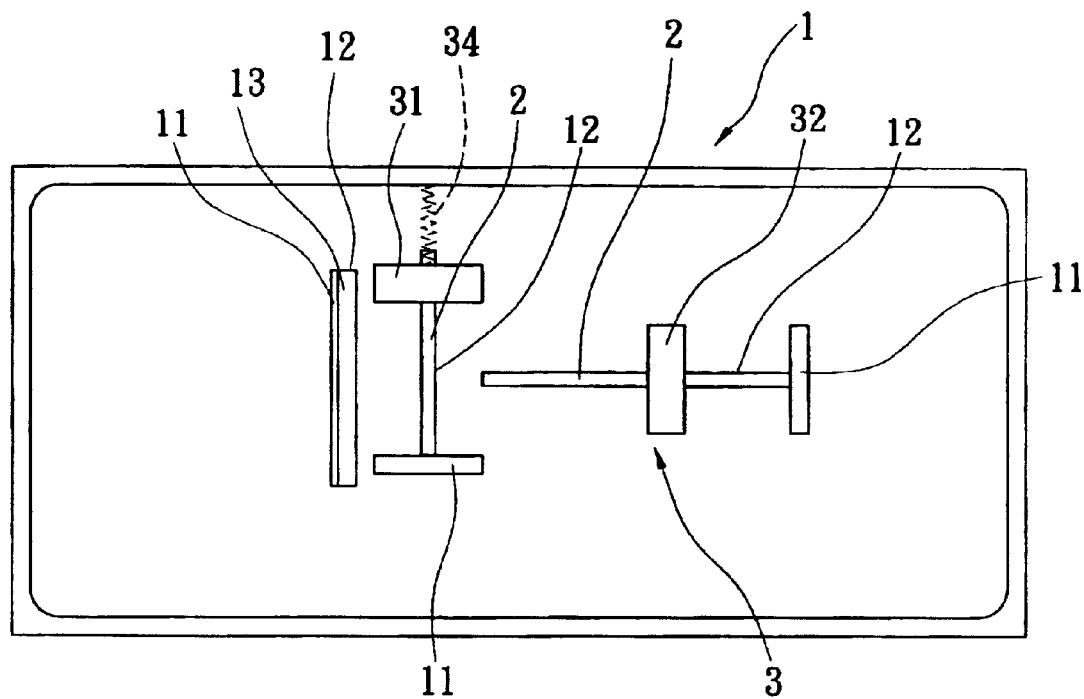
FIG. 10 is a top view of the positioning structure for a scanning article according to a fifth embodiment of the present invention.
Figure 11:
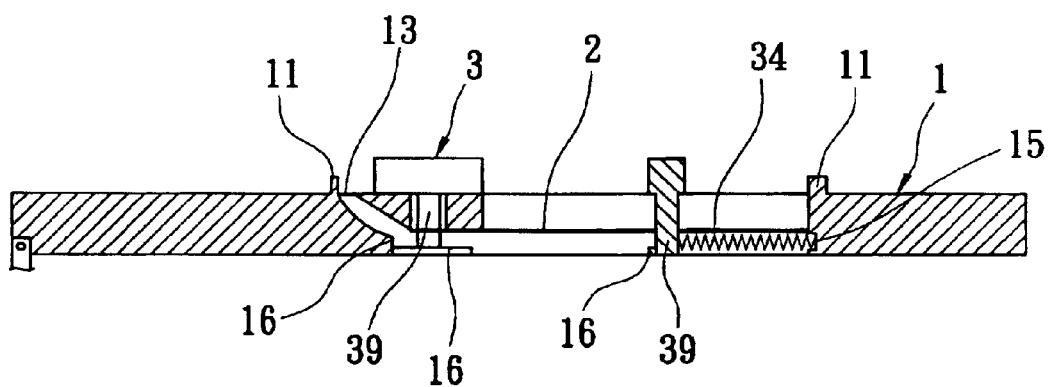
FIG. 11 is a front cross-sectional view of FIG. 10.

Referring to FIG. 10 and FIG. 11, according to a fifth embodiment of the present invention, a positioning structure for the scanning article is provided, including a hollow shell 1, flexible element 2 and a positioning module 3. The hollow shell 1 is disposed on a scanning platform, and has at least one opening 12 and projected portion 11 formed thereon. Users can place the scanning article into the hollow shell 1 through the opening 12. The opening 12 has a cover plate 13 disposed thereon. The hollow shell 1 has a guiding groove formed from the opening 12 to pass through the hollow shell 1 for guiding the scanning article. The flexible element 2 is disposed in the hollow shell 1 to shelter the opening 12 or a gap of the opening 12 from light or dust. The positioning module 3 further includes a right-width positioning sliding block 31 and a length positioning sliding block 32 that has a protrusion 39 received in the hollow shell 1 through the opening 12 and the flexible element 2, and a transparent stop portion 16 formed on the projected portion 39. A user can move the positioning sliding block 31 or 32 along the opening 12 to control the transparent stop portion 16 to move on the transparent plate for adjusting a scanning article with a different size in a predetermined position for scanning. The positioning module 3 further includes an elastic element 34 received in the hollow shell 1. One side of the elastic element 34 contacts a concave portion 15 of the hollow shell 1, and another side of the elastic element 34 contacts the projected portion 39 for providing elasticity to make the transparent stop portion 16 closely contact a side of the scanning article and positions the scanning article in a predetermined position for scanning. The scanning apparatus is coordinated with an image acquisition apparatus and software to enhance the accuracy and the scanning quality of the scanning apparatus.

The transparent stop portion 16 is extended from the projected portion 11 to the transparent plate 14 to provide a predetermined boundary origin set at an edge thereof. A user can move the positioning sliding blocks 31 and 32 along the opening 12 to control movement of the transparent stop portion 16 on the transparent plate for adjusting a scanning article with a different size in a predetermined position for scanning.

To sum up, present invention provides a positioning structure for a scanning article, which includes a hollow shell, a flexible element, a positioning module and a backward module. The user can put the scanning article onto the transparent plate or scanning plate through the opening 12. The flexible element 2 is disposed in the hollow shell through the opening to prevent light or dust from falling into the opening 12. The positioning module 3 can accurately adjust the scanning article in a predetermined position for scanning. The backward module 4 can protect the scanning article from deformation or the damage by the positioning structure.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A positioning structure for a scanning article, applied in a scanning apparatus having a scanning platform, a scanning light source received in the scanning platform and an image acquisition system arranged in a light path of the scanning light source for slidably contacting with the scanning platform, the positioning structure comprising:

a hollow shell disposed on the scanning platform and having at least one opening and projected portion formed thereon;

a stop portion formed between the projected portion and the scanning article;

at least one flexible element fixed in the hollow shell opposite the scanning platform and substantially aligned with the at least one opening; and a positioning module assembled with the hollow shell;

whereby users place the scanning article into the hollow shell through the opening, and the scanning article is positioned in a predetermined position for scanning by the positioning module.

2. The positioning structure as claimed in claim 1, further comprising a transparent plate disposed between the hollow shell and the scanning platform for allowing a light of the scanning light source into the hollow shell through the transparent plate.

3. The positioning structure as claimed in claim 1, the positioning module further comprising a right-width positioning sliding block, a left-width positioning sliding block horizontally disposed at a left side of the right-width positioning sliding block, and a length positioning sliding block vertically disposed at a side of the right-width positioning sliding block and the left-width positioning block, each of the positioning sliding blocks having at least one protrusion formed thereon, and the protrusion received in the hollow shell through the opening and the flexible element.

4. The positioning structure as claimed in claim 3, the protrusion having a transparent stop portion formed at an end thereof for contacting the scanning article.

5. The positioning structure as claimed in claim 3, the positioning module further comprising at least one gear having a non-curved surface formed at an edge thereof, the non-curved surface being pivoted on the protrusion.

6. The positioning structure as claimed in claim 3, the positioning module further comprising at least one elastic clement, one end of the elastic element being connected to the hollow shell.

7. The positioning structure as claimed in claim 5, the protrusion having a gear portion for mating with the gear of the positioning module.

8. The positioning structure as claimed in claim 5, the gear having a first gear and a second gear stacked to the first gear at the same axle center, the first gear having a pitch diameter ½ time longer than that of the second gear for positioning the scanning article in a predetermined position for scanning.

9. The positioning structure as claimed in claim 6, wherein another end of the elastic element contacts the protrusion for providing elasticity.

10. The positioning structure as claimed in claim 1, the opening having a cover plate disposed near the scanning article.

11. A positioning structure for a scanning article, applied in a scanning apparatus having a scanning platform, a scanning light source received in the scanning platform and an image acquisition system arranged in a light path of the scanning light source for slidably contacting the scanning platform, the positioning structure comprising:

a hollow shell disposed on the scanning platform and having at least one opening therein and a projected portion formed thereon;

a transparent plate disposed between the hollow shell and the scanning platform for allowing a light of the scanning light source into the hollow shell through the transparent plate;

a stop portion formed between the projected portion and the scanning article.

at least one flexible element fixed in the hollow shell opposite the scanning platform for preventing foreign objects or light from entering the shell through the opening;

a positioning module having a right-width positioning sliding block, a left-width positioning sliding block horizontally disposed at a left side of the right-width positioning sliding block and a length positioning sliding block vertically disposed at a side of the right-width positioning sliding block and the left-width positioning sliding block, each of the positioning sliding blocks having at least one protrusion formed thereon, and the protrusion received in the hollow shell through the opening and the flexible element for contacting with the hollow shell; and a backward module disposed under the opening and in the concave portion of the hollow shell;

wherein users place the scanning article into the hollow shell through the opening, the scanning article is positioned in a predetermined position for scanning by the positioning module, and after the scanning article is scanned, the backward module protects the scanning article from deformation and damage by the positioning structure.

12. The positioning structure as claimed in claim 11, the protrusion having a transparent stop portion formed at an end thereof for contacting with the scanning article.

13. The positioning structure as claimed in claim 11, the positioning module further comprising at least one gear and elastic element, the gear having a non-curved surface formed at a side thereof, the non-curved surface being pivoted on the protrusion, and one end of the elastic element being connected to the hollow shell.

14. The positioning structure as claimed in claim 13, the protrusion having a gear portion for mating with the gear.

15. The positioning structure as claimed in claim 13, the gear having a first gear and a second gear stacked with the first gear on the same axle center, the first gear having a pitch diameter ½ times longer than that of the second gear for positioning the scanning article in a predetermined position for scanning.

16. The positioning structure as claimed in claim 13, wherein another end of the elastic element contacts the protrusion for providing elasticity.

17. The positioning structure as claimed in claim 11, the backward module having at least one link and elastic element, the link penetrating through the hollow shell, and the elastic element being connected between the hollow shell and the link for providing elasticity.

18. The positioning structure as claimed in claim 11, the backward module having at least one link and elastic element, the link being pivoted on the hollow shell, and the elastic element being connected between the hollow shell and the link for providing elasticity.

19. The positioning structure as claimed in claim 11, the backward module having a plurality of links and at least one elastic element, the links being connected with each other, and the elastic element being connected between the hollow shell and the link for providing elasticity.

20. The positioning structure as claimed in claim 11, the opening having a cover plate disposed near the scanning article.

* * * * *